June 2, 1959    J. M. CALLAN ET AL    2,889,513
MAGNETIC WIRE ROPE TESTING
Filed Aug. 13, 1956    6 Sheets-Sheet 1

FIG. 1

INVENTORS
JOSEPH M. CALLAN
EDWARD D. SPIERER
BY
Pennie, Edmonds, Morton, Barrows & Taylor.
ATTORNEYS June 2, 1959 J. M. CALLAN ET AL 2,889,513
MAGNETIC WIRE ROPE TESTING
Filed Aug. 13, 1956 6 Sheets-Sheet 3

INVENTORS
JOSEPH M. CALLAN
EDWARD D. SPIERER
BY
Pennie, Edmonds, Morton, Barrows & Taylor
ATTORNEYS June 2, 1959 — J. M. CALLAN ET AL — 2,889,513
MAGNETIC WIRE ROPE TESTING
Filed Aug. 13, 1956 — 6 Sheets-Sheet 5

INVENTORS
JOSEPH M. CALLAN
EDWARD D. SPIERER
BY Pennie, Edmonds,
Morton, Barrows & Taylor.
ATTORNEYS June 2, 1959  J. M. CALLAN ET AL  2,889,513
MAGNETIC WIRE ROPE TESTING
Filed Aug. 13, 1956  6 Sheets—Sheet 6

INVENTORS
JOSEPH M. CALLAN
EDWARD D. SPIERER
BY
Pennie, Edmonds, Morton, Barrows & Taylor
ATTORNEYS

United States Patent Office 2,889,513
Patented June 2, 1959

2,889,513

MAGNETIC WIRE ROPE TESTING

Joseph M. Callan, Pelham Manor, and Edward D. Spierer, Brooklyn, N.Y., assignors to Magnetic Analysis Corporation, Long Island City, N.Y., a corporation of New York Application August 13, 1956, Serial No. 603,491

19 Claims. (Cl. 324—37)

This invention relates to non-destructive testing of elongated magnetic materials and is particularly adapted to the testing of steel wire rope and the like.

Wire rope is customarily inspected for flaws, especially broken wires, at one or more of three stages in its life: (a) as a final step in manufacture; (b) prior to use or installation and (c) after a period of use to ascertain its condition. Heretofore apparatus for the detection of defects in wire rope has been proposed, but such apparatus has lacked many of the advantages and improvements provided by the equipment of this invention.

Among the many advantages of our improved equipment are: the sensitivity is ample to detect all substantial flaws, especially at or near the surface, the accuracy of detection is substantially independent of the radial location of the flaw; the flaw signals are readily deteceted and distinguished from spurious signals caused by variations in hardness, composition or the like, by lateral movement or vibration in the testing apparatus, or by changes in longitudinal speed; rope of a considerable range of diameters can be accommodated; the rope can be placed in and removed from the test coil assembly at any point along its length, viz., without access to the end of the rope; a splice or a broken wire which protrudes far enough from the surface to catch in the detector coil assembly and which in prior apparatus would damage it, does not damage and automatically stops the operation of the equipment; additionally, if a protruding wire dislocates a detector coil thus interfering with the normal operation of the equipment, any untested portion of the rope which may thereafter pass through the equipment is automatically marked for ready identification.

A better understanding of the invention can be had from the following description considered with the accompanying drawings.

Figure 1:
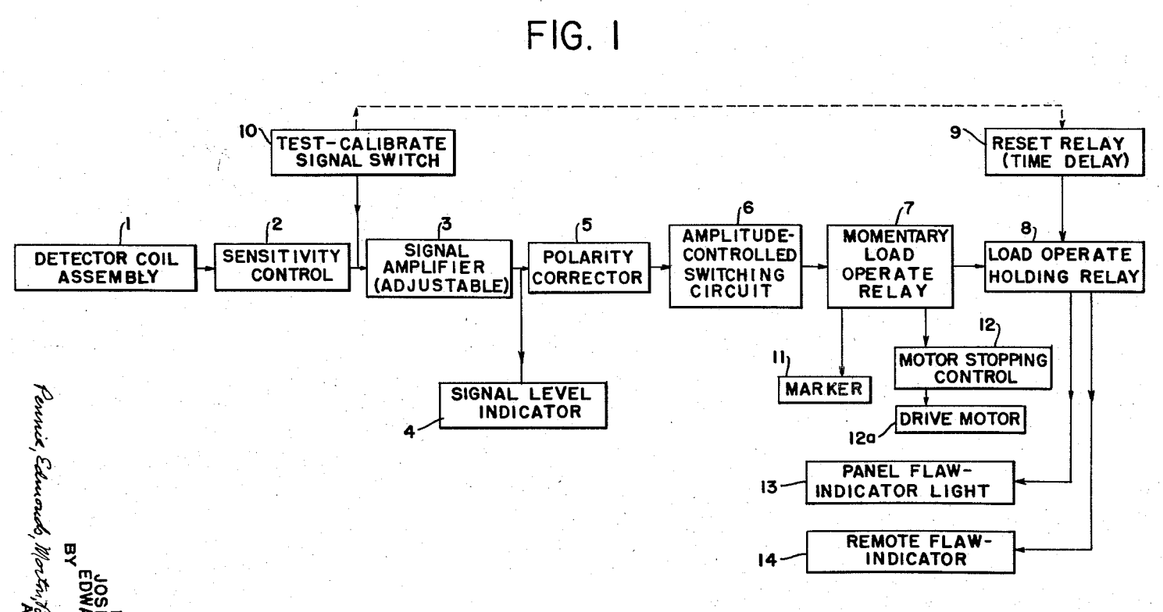
Fig. 1 is a block diagram of the equipment according to the invention.

The nature of the invention will be understood from Fig. 1 which is a block diagram representing the principal components of the equipment hereinafter described in more detail. The flaw signal generated by the detector coil assembly 1, after adjustment in respect to amplitude by sensitivity control 2, is impressed on signal amplifier 3. The signals appearing at the output of signal amplifier 3 are passed through the polarity corrector 5 which converts both negative and positive signals into uni-directional signal pulses which are impressed on an amplitude-controlled switching circuit 6. Thus the switching circuit is actuated in response to flaw signals regardless of their initial polarity.

Corresponding uni-directional signal pulses from switching circuit 6 are connected to momentary load operate relay 7 which, in the presence of the usual flaw signal, responds rapidly and only once to each signal pulse. However, under certain conditions the flaw signal received by relay 7 may comprise a rapid succession of short pulses of saw-tooth wave characteristic which will cause relay 7 to remain actuated.

Actuated in response to the operation of the momentary load operate relay 7 is a marker 11 which is positioned adjacent the path of the moving rope at the exit end of the detector coil holder. This marker is arranged to spray quick-drying paint or lacquer on the rope as it passes the spray nozzle of the marker. Since the marker is actuated by the momentary operate relay, the painted area on the rope is small and close to the defect. If the pickup coil becomes damaged or disconnected so that the new section of the rope passes without being tested, the marker operates continuously and thereby marks all of the untested portion of the rope.

In view of the fact that a normal flaw signal, caused for example by a broken wire, comprises a short pulse, momentary load operate relay 7 is normally actuated for a comparatively short period, such as one second or less. However, since so short a visible or audible signal might be unnoticed, the responsive devices 13 and 14 are connected to be actuated by the output of a holding relay 8, which operates in response to actuation of momentary load operate relay 7. The former relay remains in actuated position until intentionally deactuated, as by a manual control. Devices 13 and 14 are represented to comprise a panel indicator and a remote flaw indicator, respectively. Either or both may comprise a visible, audible or other known type of signal indicator, as desired. In the equipment herein described by way of example, indicator 13 is a panel light on the instrument, and indicator 14 includes both an indicator light and a buzzer at a point remote from the equipment.

Also actuated in response to the operation of momentary operate relay 7 is a motor-stopping control 12 which, having inherent delay characteristics, is actuated only if relay 7 is actuated continuously for a period greater than the delay period for which the control is preset. When this control actuates, it disconnects the drive motor 12a from its power source, stopping the movement of the rope through the testing equipment. Thus an unusually extensive flaw or any interruption of the detector coil circuit will shut down the drive motor. Alternatively, if a self-locking relay be substituted for the delayed action motor stopping control relay 12, the motor will stop immediately when the momentary operate relay 7 is actuated by a single signal pulse. In this case the motor will shut down for every flaw, whether it be long or short.

Means for testing and calibrating the equipment of the invention is provided by a multi-function switch 10, which will be described in connection with the circuit diagram. This test switch impresses a standard signal on the input of amplifier 3 and simultaneously operates reset relay 9 which deactuates holding relay 8 and, after a predetermined delay, itself deactuates. Connected to the output of signal amplifier 3 is a signal level indicator 4 which is employed when calibrating the equipment and, if desired, periodically to check the equipment for correct operation.

Figure 2:
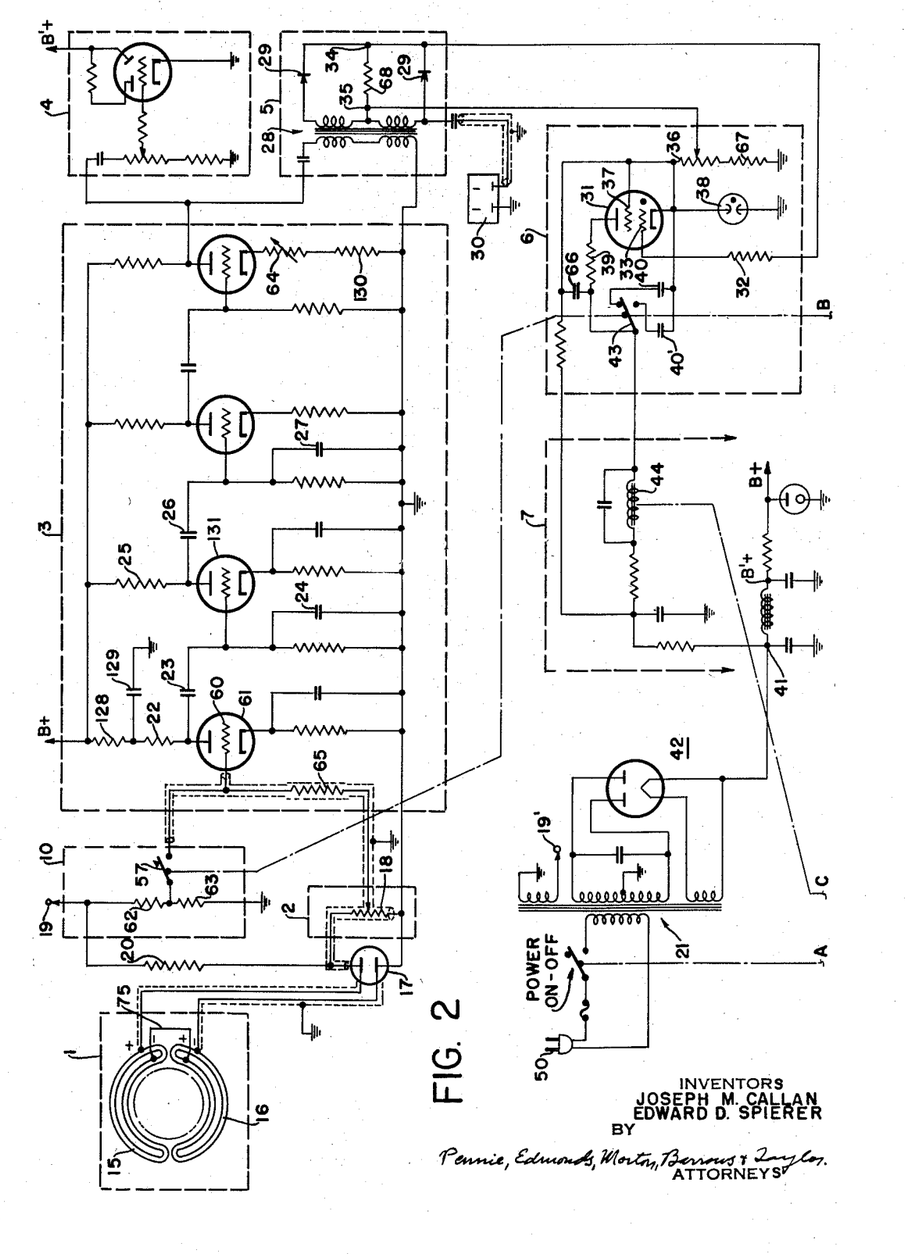
Fig. 2 is a schematic circuit diagram of the equipment represented in Fig. 1.
Figure 3:
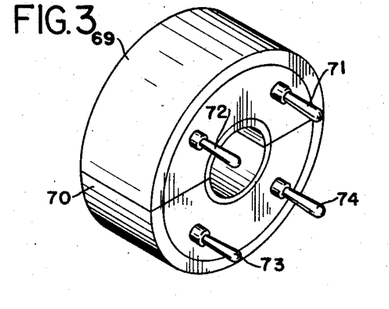
Fig. 3 is an isometric view of the detector coil assembly represented in Fig. 2.

The circuit diagram of the equipment according to the invention is shown in Fig. 2 which extends over sheets 2 and 3 of the drawings. The pickup or detector coils as here shown, comprise two windings or coil halves 15 and 16 which together cover a circle of substantially 360°. The two coil halves are connected in series aiding, as illustrated, and are mounted as shown and described in connection with Figs. 3 and 4. More generally stated, the coils are so oriented and connected as to maintain constant the polarity of a signal resulting from a single given type of flaw or point of flux leakage regardless of the location of the flaw around the perimeter of the material under test. This assures a useful flaw signal (as distinguished from zero signal) when a flaw happens to occur in a location which is magnetically symmetrical with respect to the two coils, as well as when the flaw occurs in a location which is unsymmetrical with respect to the two coils.

The detector coil is connected through shielded leads to a receptacle 17 which, in turn, is connected through suitable shielded leads to sensitivity control 2 which comprises a potentiometer 18. From this sensitivity control the flaw signals are impressed on the input of amplifier 3. In this instance the amplifier includes four stages of resistance-coupled amplification including two duplex triode tubes of the 6SL7 type. The flaw signals to be amplified comprise pulses of short (fraction of a second) duration, and this amplifier in its entirety is designed to amplify such pulses at a peak frequency of approximately 25 cycles per second, although frequencies up to approximately 100 cycles are effective in operating the equipment. Such amplifiers are well known in the art, so this one requires no detailed description except in connection with certain filter or integrating circuits which will be discussed below.

In order to energize the test coil circuit, a suitable source of alternating voltage is connected to terminal 19 which is connected in series with the detector coils through resistor 20. A regulated source of 6.3 volts is suitable. Terminal 19 may be connected to terminal 19' on transformer 21 which is assumed to be fed from a source 50 of regulated voltage.

An increase, even if small, in the normal speed (40 feet per minute) with which the rope is drawn through the apparatus tends to increase the frequency as well as the amplitude of the voltages which are generated in the detector coils. Since, in preparation for the testing operation, the equipment is adjusted to respond to flaw signals of a certain minimum amplitude, obviously it should not respond to signals normally below such amplitude. However, if the speed of the rope should increase, this threshold signal amplitude might be exceeded by voltages of background or noise type such as those due to the twist of the strands or minor variations caused by vibration or variations in characteristics of the material. Since increase in amplitude of undesired signals of this description is accompanied by increase in frequency, a two-stage integrating filter is included in the amplifier. The first integrating filter comprises resistor 22, the anode resistance of tube 61, and condensers 23 and 24, and the second integrating filter comprises resistor 25, the anode resistance of tube 131, and condensers 26, 27. As a result, speed variations usually experienced are substantially compensated for the purposes of the invention.

Since the original flaw signal generated in the entire detector coil or in a detector coil winding may be either a positive or a negative pulse, depending on the type of flaw, it is important that either polarity of pulse be equally effective in operating the equipment. As mentioned previously, the polarity of this pulse would not be affected by its location around the periphery of the material under test. Therefore, a polarity changer 5 is connected to the output of amplifier 3. In essence this polarity corrector comprises a full-wave rectifier having a double-winding transformer 28 and two diode rectifiers 29 which may be of the germanium type. The flaw signal output from this polarity corrector comprises a series of uni-directional pulses regardless of the polarity of the flaw signals as originally generated. A receptacle 30 is connected to the polarity corrector 5 to provide convenient means for connecting a recorder to the equipment, if desired, so as to obtain a record of all of the signal voltage fluctuations, including polarity.

The uni-directional signal pulses from the polarity corrector 5 are impressed upon the amplitude-controlled switching circuit 6 which, in this embodiment, includes a gas-filled rectifier tube 31, of which a Thyratron type 2050 is a satisfactry example. This Thyratron is connected as a relaxation oscillator. Ordinarily it fires only once per flaw signal. The positive uni-directional signals from the high potential terminal 34 of the polarity corrector 5 are connected through resistor 32 to the control grid 33. The low potential output terminal 35 of the polarity corrector is connected to the slider of potentiometer 36. One end of this poentiometer is grounded through resistor 67, and the other end is connected to the screen grid 37. Potentiometer 36 provides means for adjusting the bias on tube 31 for predetermining the firing potential. Neon tube 38 is a voltage regulator to stabilize the biasing voltage. As herein employed, Thyratron 31 is so biased that it fires on a signal which is just sufficient to cause full deflection of the signal-level indicator 4. In this case the indicator comprises a type 6E5 "tuning eye" tube connected in a conventional circuit.

A series circuit including resistor 39 and capacitor 40 is connected between the anode and cathode of Thyratron tube 31, as shown. Capacitor 40 being of large capacitance (10 mfd.) is rapidly discharged through resistor 39 whenever tube 31 fires. When tube 31 extinguishes, this capacitor is recharged from terminal 41 of the voltage supply source 42. Capacitor 40' is substituted for capacitor 40 when switch arm 43 is moved downward. Since the alternative capacitor is of small capacitance (2 mfd.) its rate of charge and discharge is faster, which is desired under test conditions, as will be explained below.

Connected in the charging circuit to capacitor 40 is solenoid 44 of momentary load operate relay 7. This solenoid is, therefore, energized for the period required to charge capacitor 40 or 40'. In the circuit shown, these periods are approximately 1 second and ⅕ second, respectively. Actuation of momentary operate relay 7 closes contact 46 (Sheet 3) which closes the circuit to solenoid 47 of holding relay 8, and also energizes panel lamp 13. Under the circumstances presently assumed, the operation of devices 8 and 13 is but momentary. However, momentary actuation of holding relay 8 closes contact 48 of that relay thus connecting its solenoid 47 to the power source 49 which holds it actuated. Actuation of relay 7 also energizes marker 11 and any other responsive device which may be connected in parallel with the marker. One of these is stopping control 12; but being (in the illustrated example) of a time-delay type, it will not operate unless the signal, whether steady or comprising a succession of pulses, persists for a minimum time of approximately 3 seconds. Therefore, normal flaw signals which comprise isolated pulses of 1 second or less will not operate this motor stopping control, but they will actuate the marker, as previously mentioned.

Motor-stopping control 12 may comprise any of several available time-delay relays, or may be of the self-locking type as above mentioned. The one illustrated is know as Amperite 115C3 thermal time delay relay which operates on 115 volts. If the flaw signal is substantially continuous (such as by a succession of pulses) for a period of approximately three seconds or more, due to the disconnection of the pickup coil from its circuit, or for any other reason, the relay 12 will operate, opening the circuit to motor 12a which drives the rope through the equipment. This motor is coupled to shaft 91 of the drive pulley 92 shown in Fig. 4.

Actuation of holding relay 8, as above mentioned, closes contact 48 which locks the relay in actuated position and also continues the energization of panel lamp 13 which is then connected in parallel to solenoid 47. Additionally, the remote flaw indicator 14 is also actuated. This may be an indicating lamp, as represented in the drawing, or may comprise any other desired type of signalling device or indicator located at one or more remote points. In most installations this indicator 14 would comprise a lamp and an audible device such as a buzzer or horn.

Marker switch 51 when in the "Off" (down) position disconnects the marker 11 and illuminates the panel lamp 13 calling attention to the fact that the marker is not operating. It also energizes solenoid 52 of reset time delay relay 9. Contacts 53 of this relay are normally closed. Actuation of the relay, therefore, opens these contacts and disconnects the power line from all of the indicating devices (except panel lamp 13), including the marker and the motor stopping control, as well as holding relay 8. De-energization of the holding relay resets the indicating devices. Relay 9 operates as a time delay relay by reason of the large condenser 54 which is connected across solenoid 52 through resistor 55.

When marker switch 51 is thrown to the "On" position contacts 56 are opened, thus deactuating reset relay 9, closing contacts 53 and resetting the indicators and the holding relay, after a delay period of from ½ to 1 second. This delay prevents false marking or other indications, or false operation of relay 8, due to transients caused by sudden making or breaking of circuits.

The test or calibrating signal switch 10 includes switch arms 57, 43, 58 and 59 which, as indicated, are unicontrolled. The normal position of this switch is as illustrated in the drawings. When the switch is depressed the lower contacts are closed. Closing of this test switch closes switch arm 58 which is in parallel with contact 56 on the marker switch. Hence the holding relay and the above-mentioned indicator circuits can also be reset by momentary closure of the test switch.

The principal use of test or calibrating signal switch 10 is in testing the operation of and calibrating the settings of the various controls of the equipment to assure standardized, uniform operation. When by depressing the test switch 10, switch arm 57 closes with its contact, an artificial signal of approximately 1 millivolt, at 60 cycles per second, is applied to the control grid 60 of the first amplifier tube 61. This voltage is predetermined by the magnitudes of a voltage divider network comprising resistors 62 and 63. The calibration control 64 is then adjusted until the signal level indicator 4 indicates full deflection. Calibration control 64 is, as shown, a variable resistor which adjusts the gain of the last tube of the amplifier.

Operation of test switch 10 also substitutes the smaller condenser 40' for the larger condenser 40 in switching circuit 6. This causes the Thyratron 31 to fire more rapidly than normal in order to facilitate calibration and setting of the controls.

Simultaneously, closure of switch arm 58 energizes solenoid 52 of reset relay 9 which, as above explained, deenergizes the indicator circuits and releases the holding relay 8. Finally, movement of switch arm 59 from its upper contact to its lower contact disconnects the marker and the motor-stopping control and illuminates panel lamp 13.

The above-described adjustments are made while the rope is stationary in the detector coil assembly. In order to adjust the sensitivity of the detector circuit, the potentiometer 18 of sensitivity control 2 is adjusted while the rope is in motion at normal speed, preferably employing for the purpose a section of rope known to have no flaws. Then, the foregoing adjustments having previously been made, potentiometer 18 is adjusted until the signals comprising normal background "noises" produce a deflection of the signal level indicator 4 to approximately 75% of full deflection. This adjustment is, of course, empirical and can be made on any other desired standard depending upon the requirements of a given test.

The adjustments above described are in part related to the impedances of the test coil and of resistors 65 and 18. It is desirable that when the test switch is depressed, impressing a signal of, say, 1 millivolt on tube 61, the shunt effect of the test-coil coupling circuit will be inappreciable. Therefore, the resistance value of resistor 65 should be much greater than that of resistor 63. Here the ratio is 1000. Additionally, the impedance relation of the test coil to the potentiometer 18 is important, especially if it is desired to shut down the driving motor or control some other function when the test coil is disconnected. For this reason it is preferred that the impedance of the test coil be no greater than the value required to produce a signal voltage considerably greater than the value of the calibrating voltage for which the calibrating control 64 is adjusted. It has been found that a satisfactory value of coil impedance will produce a normal voltage on the grid 60 of tube 61 of 0.1 millivolt, as compared to the assumed value of 1 millivolt on the grid as a calibrating voltage. As a result, if the test coil is either accidentally or intentionally disconnected, a voltage will be impressed on grid 60 which is many times greater than the normal grid voltage, and also greater than the usual flaw signal voltage. This large signal can readily be employed to actuate a suitable high-amplitude responsive circuit, or, because it will also be prolonged, may actuate a circuit such as the motor control herein described. The mentioned amplitude-responsive circuit may be similar to that of tube 31, comprising a Thyratron in parallel with tube 31, but biased to operate at a higher control voltage.

The several novel features relating to the form and construction of the detector coils, their mountings and housing will now be explained in connection with Figs. 2-11, inclusive.

The detector coil shown in Figs. 2-5 comprises two windings or coil-halves 15, 16, represented at the left of Fig. 2. In forming them, each of these coil-halves is first wound on a cylinder with, say, 400 turns of #38 wire compactly disposed in layers so that in cross-section the multi-layer winding forms a rectangle approximately ⅛" x ⅛". Coils for different diameter ropes would usually have different winding dimensions, a rope of ½ inch or larger diameter being here assumed. For smaller ropes more turns are required. The circular coil is then removed from the cylindrical form, bent into crescent shape as shown in the drawing, and impregnated. Each coil-half is cast in a protective casing, 69, 70, of insulating material. The two ends of the winding 15 are connected to the split pins 71, 72, and the two ends of the winding 16 are connected to the split pins 73, 74. The coil pins plug into jacks 82, 82a in an adaptor 76 and the adaptor, in turn, plugs into a socket member 77 which is anchored to the insulating cylinder 78 by set screws 79, 80. The adaptor includes connector pins 81, 81a which fit the matching jacks 84, 84a in the socket member. The jumper 75 (Fig. 2) between coils 15 and 16 is made by a flexible wire between the two jacks 84a at the lower portions of the two halves of socket member 77. By employing different adaptors, different detector coils having dimensions suitable for testing a wide range of rope diameters can readily be substituted. Alternatively, it is possible to construct a series of detector coils designed for passing ropes of different diameters respectively, and all mounted on base plates carrying pin terminals spaced to match the jacks 84, 84a in the socket member 77. In all cases the spacing between the surface of the detector coil casings and windings should be as small as possible. A clearance of from 1/8" to 1/4" between the rope and the inner surface of the casing is satisfactory.

Figure 5:
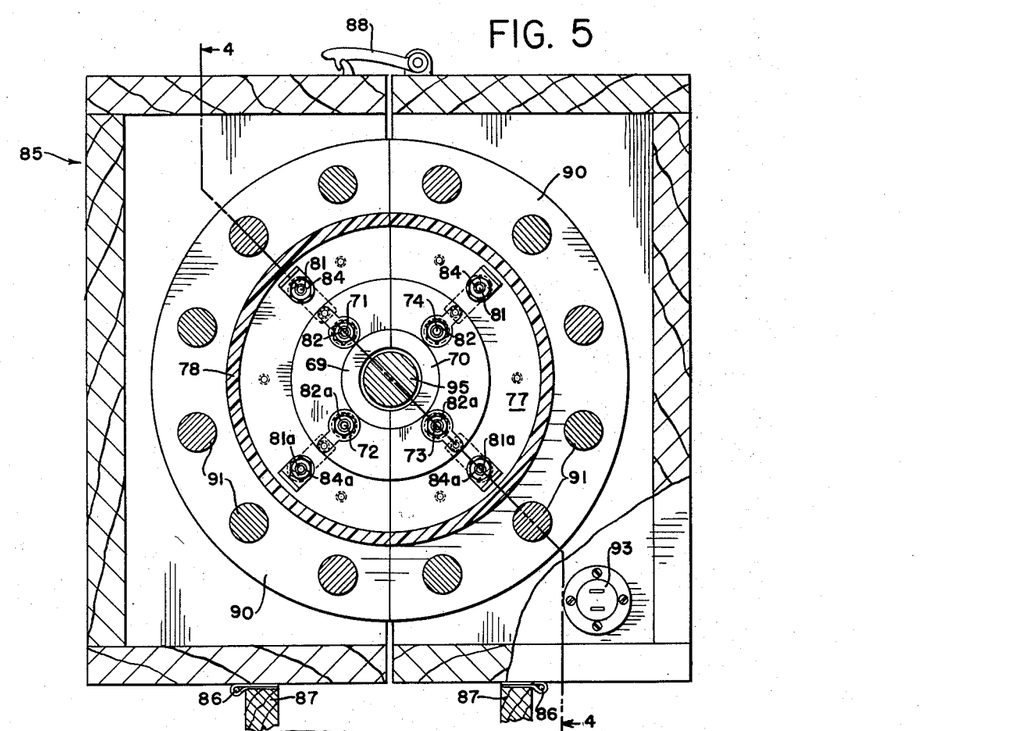
Fig. 5 is a cross-sectional view taken along the line 5—5 of Fig. 4.

Surrounding the cylinder 78 is a housing 85 which should be of non-magnetic material here represented as wood. This housing is shaped and proportioned in any convenient manner to support and encase the components within it. An elevational view in cross-section is shown in Fig. 5. This housing is made in two similar parts hinged together at the bottom by hinges 86 which are secured to a suitable support 87 below them. A latch 88 at the top of the housing holds the two parts of the housing together, except when it is released and the two parts are separated to provide ready access to the components which it contains.

Figure 4:
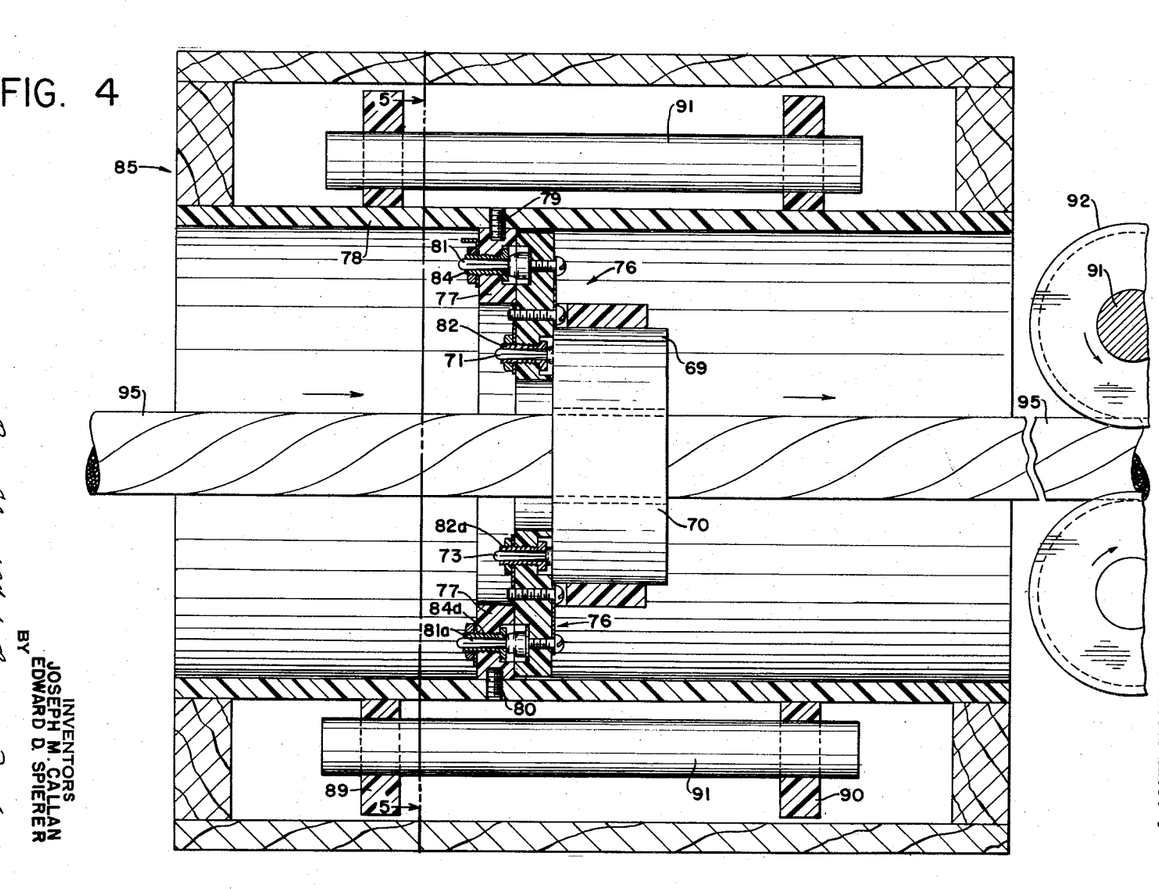
Fig. 4 is a longitudinal section of a detector coil and housing assembly employing a coil such as represented in Fig. 3.

As seen in Figs. 4 and 5 the split cylinder 78 carries two rings 89 and 90 of insulating material spaced apart and supported edgewise on the cylinder. These rings of insulating material support twelve permanent magnets 91 of bar form which pass through holes in the rings. These bar magnets being similarly poled and symmetrically disposed around the rope, provide a uniform unidirectional field of considerable strength. A similar field can be produced by D.C.-energized field coils, but not so conveniently because of the preferred requirement that the housing be separable. Since these rings are split vertically, as shown in Fig. 5, they open with the housing. The receptacle mounting for the coils is also split vertically for the same reason. Therefore, to insert or remove a rope or other material being tested, or to insert or remove test coils, it is necessary only to unlatch the housing and open it as above described.

A flexible shielded lead of suitable length, at one end connects to the detector coil through connector 93 (Fig. 5) and at the other end plugs into the amplifier through connector 17 (Fig. 2). A given flaw will simultaneously induce voltages of like polarity in the inner and outer portions of each coil winding. These induced instantaneous voltages oppose each other because their currents flow in opposite directions. However, the voltage in the inner turns is larger than that in the outer turns, so there is a net difference voltage which is available as a flaw signal.

It is evident from Fig. 4 that as the rope passes from left to right in the drawing any enlargement of the rope or the protruding end of a broken wire might strike either (or both) of the coil casings 69 and 70 forcing it to the right, away from the adaptor. As a result, a voltage will be built up in the detector coil due to the movement of the coil winding through the magnetic field surrounding it. If this movement is rapid, the resulting signal will be large enough to actuate the flaw-indicating devices. If the movement of the rope continues, as would usually be the case, the intercepted coil will be disconnected entirely from the adaptor or from the socket into which it is plugged and will be carried along for a short distance by the rope. Since the coil casings are in halves, the displaced half or halves will quickly fall off the moving rope, onto a shelf or pan (not shown) which is located below the detector coil housing at the exit end which is at the right in the drawing. Such disconnection of the detector coil, in addition to producing a strong flaw signal, will also, as above described in connection with Fig. 2, produce a signal which will stop the movement of the rope.

Figures 6, 10, 11:
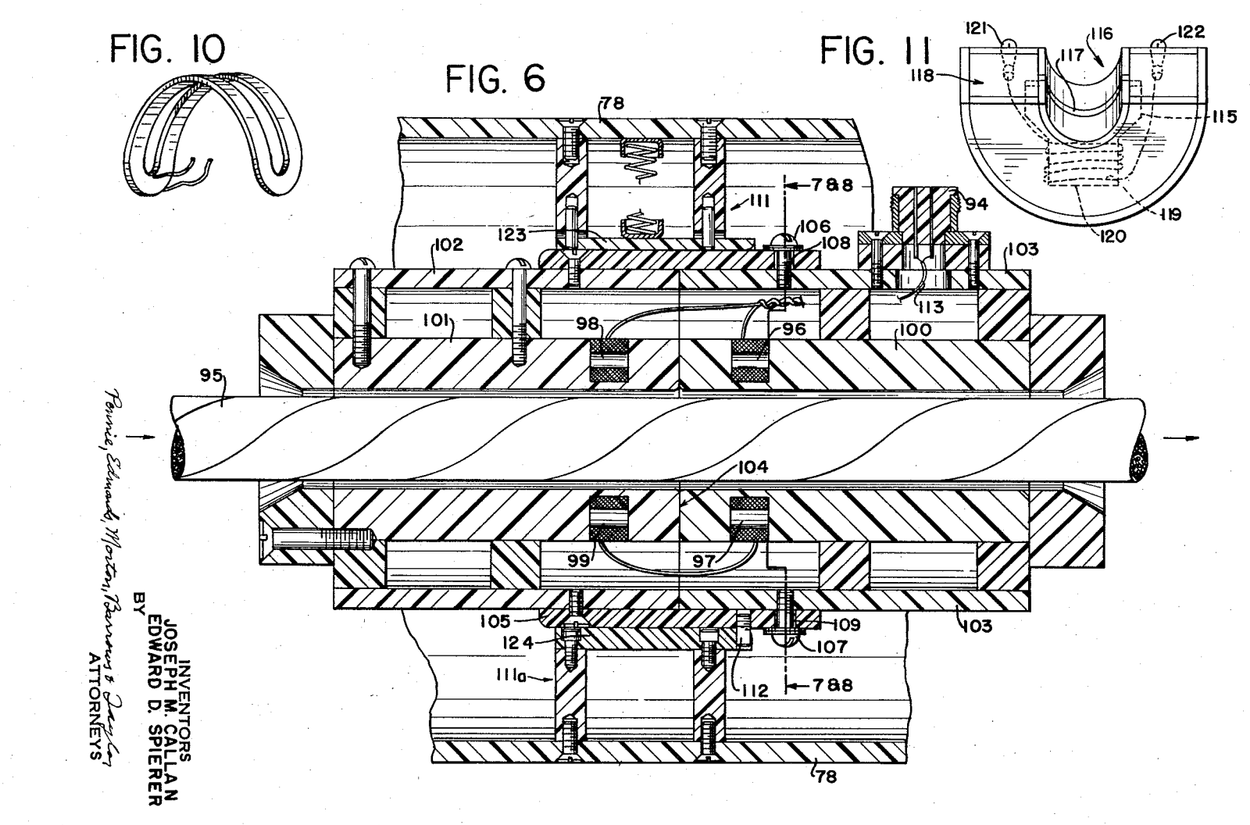
Fig. 6 is a view in longitudinal section of an alternative detector coil assembly suitable to substitute in the housing of Fig. 4.
Fig. 10 is an isometric view of a detector coil winding which is alternative to that of Fig. 2.
Fig. 11 is an isometric view of another alternative detector coil in some respects similar to the coils of Figs. 2, 3 and 10 but having a magnetic core.
Figure 7:
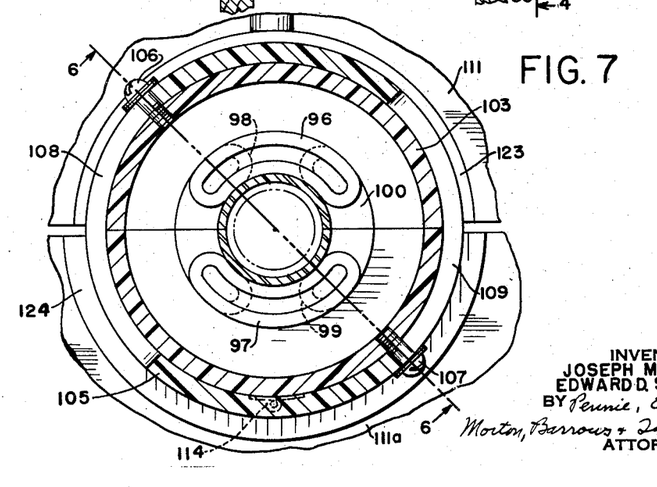
Fig. 7 is a cross-sectional view taken along the line 7—7 of Fig. 6 showing the coils in operative position.
Figure 8:
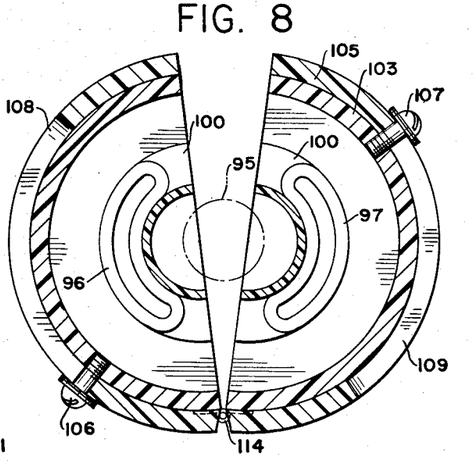
Fig. 8 is a cross-sectional view corresponding to Fig. 7 but with one of the coils rotated and the form partly opened, after removal from the retaining clamp.

An alternative embodiment of detector coil and housing assembly is shown in Figs. 6, 7 and 8. The construction here illustrated is not so simple as that illustrated in Figs. 4 and 5 but provides complete scanning or coverage of the periphery of the rope or other material under test. The additional complication involved in the construction of this modification is of value primarily in detecting a flaw so small that it might be missed by the previously described coil assembly if the flaw happened to pass exactly midway between the adjacent curved ends of the two windings of the detector coil.

Figure 9:
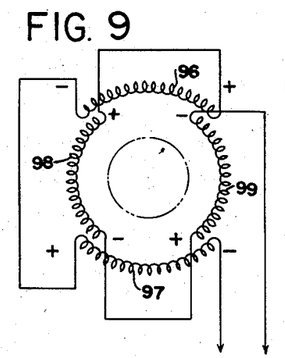
Fig. 9 is a schematic diagram of connections of the coils of Figs. 6–8.

In this embodiment the individual windings are also made crescent shaped as before; and they may comprise the same number of turns for corresponding rope diameters. However, four windings are employed in overlapping relation and, instead of covering an arc of substantially 180°, each winding in this case covers an arc of about 140°, or less. Since these coils overlap magnetically they must also overlap physically. Therefore, there is no advantage in mounting the windings separately in halves as in the previous case illustrated in Figs. 3–5, although the same advantages are otherwise achieved in this embodiment. As shown in Fig. 9, the four overlapping windings are serially connected in two pairs, 96—97 and 98—99, such that the polarity of each pair is series-aiding and the current in one pair with respect to that in the other pair is in opposition. This form of connection tends to null out voltages developed by variations other than flaws desired to be detected, viz., vibration of the material, variations in characteristics of the material and other background or "noise" voltages.

Referring to Figs. 6 and 7, the four windings comprising the detector coils of this embodiment, numbered, respectively, 96, 97, 98 and 99, are wound in channels in two coil-supporting cylinders 100 and 101 of insulating material. These channels are spaced apart about one inch. Coil-supporting cylinder 101 is secured to fixed external cylinder 102, also of insulating material, and rotating cylinder 100 is secured to external rotating cylinder 103. All four of these cylinders about in pairs at the vertical plane 104. Spanning this severance plane is a cylindrical sleeve 105 of insulating material which is secured to cylinder 102, but within which cylinder 103 is free to rotate around the common axis of the cylinders over an arc of 90°. This rotation is permitted by two screws 106 and 107 which are threaded in cylinder 103 but are free to move in 90° slots 108 and 109, respectively, cut in sleeve 105. A suitable receptacle 94 mounted on cylinder 103 connects through a length of flexible shielded lead wires 113 to the mentioned coils.

As can be seen more clearly in Figs. 7 and 8, cylinders 100—101, 102—103 and sleeve 105 are split longitudinally into halves which are separately hinged at the bottom. Only one hinge, 114, shows in the drawings. Hence when cylinders 100 and 103 with their respective windings 96 and 97 are rotated so that both pairs of coils are aligned as illustrated in Fig. 8, the split edges of the cylinders and sleeve are all on the same plane, permitting the two halves of the assembly to swing apart on their hinges as in the previous embodiment. Thus the elongated material under test can readily be inserted in (or removed from) the coil assembly, after which, by the mentioned rotation, the pairs of detector coils will assume the operating position shown in Fig. 7, and the coil assembly can be slid into position in its housing (not shown) which corresponds to housing 85 of the embodiment of Fig. 4, although in this case it is not separable into two sections. It is to be understood that, as in the previous example, within the housing suitable field magnets or coils are symmetrically arranged as previously described.

In this embodiment the protective coil assembly is frictionally retained within a barrel clamp 111, 111a of insulating material so that the inner coil assembly represented in Fig. 6 can slide axially if the friction is overcome, or if the clamp is released. The barrel clamp includes the concave clamp pieces 123 and 124. Clamp piece 123 is spring-pressed from cylinder 78 and piece 124 is rigidly secured to cylinder 78. Hence coil assemblies of dimensions suitable to accommodate rope of different diameters can readily be substituted by the simple expedient of sliding it out of the housing toward the right (as seen in Fig. 6) and then sliding in a substitute assembly. Correct positioning within the fixed electromagnetic field is assured by stop pin 112 which is threaded in sleeve 105.

The ability of the coil support structure to slide out of the supporting clamp 111, 111a also provides for actuation of the motor stopping control 12 (Fig. 2) in the manner described in connection with the coil assembly of Fig. 4. Usually the slack in the connecting leads between receptacle 94 and the housing permits sufficient longitudinal movement of the detector coils to actuate the mentioned motor-stopping control. However, if this movement is too limited for the purpose, or if the leads might be damaged a slight modification from the form illustrated will provide actual disconnection of the detector coils after they have moved a short distance. This can readily be accomplished by imbedding spring-pressed contacts in supporting clamp piece 124 and by imbedding in the adjacent surface of sleeve 105, flush metal contacts which connect to the coils and to leads 113. In that case receptacle 94 would be omitted. Thus, also, the necessary connections to receptacle 17 of Fig. 2 would be automatic, as soon as the coil assembly is slid into operating position within the housing.

In Figs. 10 and 11 two further modifications of detector coil windings are illustrated. The winding shown in Fig. 10 may be substituted for the detector coil winding of Fig. 2, being for most purposes substantially equivalent because it has the same advantages. The principal difference in form between the coil windings of Fig. 2 and Fig. 10 is that the first is of crescent form, viz., edge-wound, and the second is of saddle form, viz., flat-wound. In the embodiment of Fig. 10 the sides of the cylindrical coil are pressed together until they are parallel and then they are placed flat on a small cylinder and bent into a semicircle as seen in the drawing. The two coil-halves will then be disposed with their curved ends abutting as in Fig. 2. It is usually not necessary to employ as many turns in each winding of this type coil because more of the turns are close to the material under test. As an example, it has been found that in the winding of Fig. 10 approximately ¼ as many turns may be required as compared with the turns required in the crescent shaped coil of Fig. 2.

The detector coil winding illustrated in Fig. 11 is also suitable for substitution for that of Fig. 2. However, the winding itself is quite different in form and in magnetic qualities, because here a magnetic core is employed. In the embodiment of Fig. 11 a strap-shaped core 115 of laminated transformer iron of ⅛ inch, or less, in total thickness is provided. This is cut in the form of a yoke with an inner radius equal to that of the central aperture 116 of the casing. It is preferable that the surface 117 of the core yoke be as nearly as possible flush with the inner surface of the casing 118 to minimize the air gap between the core and the rope. As the drawing shows, the thickness of the core is much less than the width, so that a very thin edge of core scans the rope as it passes. This provides extreme sensitivity to breaks in individual strands or equivalent flaws in other materials. A winding 119 of the order of 100 turns or more is placed around the leg 120 of the core and connected to split pins 121 and 122 as in the embodiment of Fig. 3. Two similar windings, each preferably cast in a casing, are employed together to form a complete detector coil as described in connection with the embodiment of Figs. 2–5, inclusive. In effect, these two core-halves when assembled together are substantially equivalent to a unitary strap-shaped core having a hole through its center to pass the rope, half of the required coil being symmetrically wound on each core end.

In general, the values of the circuit components shown in Fig. 2 would be obvious to those skilled in the art, and would depend largely on the arbitrary choice of tube types, frequencies, etc. However, to facilitate practicing the invention the possibly less obvious values are listed below, by way of example only, because the invention is intended to include various modifications within the scope of the claims.

Potentiometers:

| | | |
|---|---|---|
| 18 | ohms | 100K |
| 36 | do | 10K |

Resistors:

| | | |
|---|---|---|
| 18 | ohms | 100K |
| 20 | megohms | 40 |
| 22, 25, 32, 68 | ohms | 100K |
| 39 | do | 20 |
| 45 | do | 50 |
| 55, 126 | do | 100 |
| 62 | do | 6.3K |
| 63 | do | 1 |
| 64 | do | 2K |
| 65, 130 | do | 1K |
| 67 | do | 30K |
| 128 | do | 10K |

Condensers: Mfd.

| | |
|---|---|
| 23, 26, 27, 127 | 1.0 |
| 24 | 0.5 |
| 40 | 10 |
| 40' | 2.0 |
| 54 | 20 |
| 66 | .004 |
| 125 | 0.1 |
| 129 | 8.0 |

We claim:

1. In apparatus for magnetic testing of wire rope and like material in longitudinal movement, a detecting coil assembly comprising a plurality of symmetrically formed windings disposed to closely surround the material to be tested, normally stationary casing means for said windings having a central aperture through which said material may pass, signal-actuated equipment responsive to single impulses and longer signals, separable conductor means for connecting said windings to said equipment, responsive means connected in said equipment which is actuated only by a signal of duration substantially longer than that of a single impulse, holding means disposed and proportioned to support said casing means by frictional engagement, a housing in which said holding means is secured, and means in said housing for establishing a magnetic field around said windings, said casing means being slidable in said holding means in the direction in which said material is adapted to pass therethrough, whereby movement of said casing and windings through said field produces signal voltage of duration sufficient to actuate said responsive means.

2. Apparatus according to claim 1 which includes means for driving said rope through said detecting coil assembly, and connections from said responsive means through which said driving means is automatically deactuated in response to flaw signals.

3. Apparatus according to claim 2 in which said signal-actuated equipment includes an amplifier, resistor means connected in parallel to said windings for coupling the same to the input of said amplifier, means for connecting a standard source of regulated A.C. energizing voltage to said windings, test means for connecting to the input of said amplifier an A.C. calibrating voltage derived from said standard source, and adjustable calibration means connected to said amplifier for adjusting the amplitude of the amplifier signal output to a value representing a flaw signal, the impedance of said windings together being no greater than the value required to impress on the input of said amplifier a voltage considerably less than the calibrating voltage on said input for which said calibration means is adjusted, whereby disconnection of said test coils produces an input signal voltage to said amplifier considerably greater than that produced by a flaw.

4. In apparatus for magnetic testing of wire rope and like material in longitudinal movement, a detecting coil assembly comprising a plurality of symmetrically formed coils disposed to closely surround the material to be tested, normally stationary casing means for said coils having a central aperture through which said material may pass, signal-actuated equipment responsive to single impulses and longer signals, means for connecting said coils to said equipment, responsive means in said equipment which is actuated only by a signal of duration substantially longer than that of a single impulse, holding means disposed and proportioned to support said casing means by frictional engagement, a housing in which said holding means is secured, and means in said housing for establishing a fixed magnetic field around said coils, said casing means being slidable in said holding means in the direction in which said material is adapted to move therethrough, whereby movement of said casing means and coils through said field is adapted to separate said conductor means and thereby produce a signal of duration sufficient to actuate said responsive means.

5. In apparatus for magnetic testing of elongated material, a detecting coil assembly comprising two multi-turn coil-halves, each coil-half consisting of two side portions joined by curved ends, said side portions being curved substantially in a semi-circle on the same radius and lying in spaced parallel planes, said spacing being of the same order of magnitude as the cross-sectional thickness of the wires forming a side portion, said coil-halves being disposed with their curved ends abutting to form an approximate circle and further disposed and connected so that the pair of contiguous side portions which together form an approximate circle are connected so as to produce a substantially continuous electromagnetic field directed radially outwardly in both halves if a current is passed through them, and means for producing a uniform unidirectional magnetic field around said coils with the axes of both of said fields coinciding.

6. In apparatus for magnetic testing of wire rope and the like, cylindrical means enclosing a detecting coil assembly which comprises a first coil and a similar second coil coaxial therewith, said means being split longitudinally forming halves, each coil comprising a pair of two similar multi-turn crescent-shaped windings, each winding having an inner radius and a concentric outer radius joined by rounded ends, the windings of each pair being symmetrically disposed in the same plane with their inner radii on a circle of slightly larger diameter than that of the material to be tested, said coils lying in different planes spaced apart normal to the axis of the material under test, means for supporting said first coil fixed in said cylindrical means so that a line through the centers of and in the plane of the windings thereof intersects and is transverse to the axis of the material to be tested, means for supporting said second coil in said cylindrical means in a plane spaced from and parallel to said first plane so that when the coils are in testing position a line through the centers of and in the plane of the windings of said second coil intersects and is transverse to said axis and substantially 90° to the first-mentioned line, circuit means connecting said coils in series aiding and the windings of each pair in series opposition to each other, means for rotating said second coil substantially 90° on said axis so that said lines are substantially parallel, and hinge means attached to said cylindrical means along the line of said split such that said hinge means are operable when said lines are substantially parallel and are inoperable when said lines are non-parallel.

7. In apparatus for testing moving wire rope and the like for flaws, a detector coil assembly comprising means for establishing a substantially symmetrical uni-directional magnetic field surrounding the material to be tested and detector coil means adapted to surround said material within said field, a multi-stage amplifier including filter means adapted to pass frequencies of approximately 25 cycles per second and to attenuate frequencies above 25 cycles increasingly with increase in frequency, resistor means connected in parallel to said coil means for coupling said coil means to the input of said amplifier, means for connecting a standard source of regulated A.C. energizing voltage to said coil means, test means for connecting to the input of said amplifier an A.C. calibrating voltage derived from said standard source, adjustable calibration means connected to said amplifier for adjusting the amplitude of the amplifier signal output, the impedance of said coil means being not appreciably greater than the value required to impress on the input of said amplifier a voltage considerably less than the calibrating voltage on said input for which said calibration means is adjusted, polarity correcting means coupled to the output of said amplifier for converting positive and negative signals from said amplifier into uni-directional voltage pulses, relay means responsive to said pulses, and indicating means actuated by said relay means.

8. A coil assembly adapted to detect flaws in wire rope and like material in longitudinal movement, comprising two complementary halves abutted together, each half including a casing of non-magnetic material, a strap-shaped magnetic core enclosed in said casing, said core having a semi-circular aperture in one end proportioned and adapted to pass substantially one-half of the periphery of a rope when its longitudinal axis is normal to the plane of said core, the inner surface of said casing being shaped substantially to coincide with the curve of said aperture, the other end of said core extending into said casing, a multi-turn conductive winding wound around the last-mentioned end of said core, and complementary separable connector means on both casings connected to terminals of the respective windings therein and adapted when interengaged to interconnect said windings and retain said halves together whereby to form a substantially continuous strap-shaped core having a central circular aperture and carrying a coil divided into two symmetrical windings, one on each side of said circular aperture.

9. In apparatus adapted for magnetic testing of wire rope and like material in longitudinal movement, means for establishing a uni-directional magnetic field symmetrically around the material to magnetize the same, a detecting coil assembly through which the magnetized material is adapted to move comprising a strap-shaped core of magnetic material, said core being of width exceeding that of said material and of thickness much less than its width, said core having an aperture therethrough proportioned to pass said material with only a small uniform air-gap between said core and material, a multi-turn coil wound on said core, said coil being equally divided into two windings disposed equidistant from the center of said aperture, connecting means for connecting said windings to each other and to a signal responsive circuit, and means, including said connecting means, for establishing constant the polarity of the flaw signal resulting from a single point of flux leakage at any location around the perimeter of the material under test.

10. In apparatus for magnetic testing of elongated material in longitudinal movement, a detecting coil assembly through which the material is adapted to move, comprising two similar multiturn coil-halves, a separate casing enclosing each coil-half and having a central semi-aperture, said casings being physically proportioned so that when placed together the two semi-apertures combine to form a single aperture shaped to accommodate the perimeter of the material to be tested, first separable connector means on each of said casings connected to terminals of the coil-half therein, supporting means for said casings, second separable connector means on said supporting means disposed and adapted to engage with said first connector means, said first and second connector means being engageable and disengageable along lines parallel to the longitudinal movement of said material, external-circuit connecting means, and electrical connections between certain of said second connector means and from others of said second connector means to said external-circuit connecting means such that the engagement of said first and second connector means serves to connect said coil-halves together and simultaneously to connect both of said coil-halves to said external-circuit connecting means.

11. In apparatus for magnetic testing of wire rope and like material in longitudinal movement, a detecting coil assembly comprising a plurality of symmetrically formed windings disposed to closely surround the material to be tested, normally stationary casing means for said windings having an aperture through which said material may pass, external-circuit connecting means, electric conductor means for connecting said windings to said connecting means, holding means disposed and proportioned to support said casing means by frictional engagement, a housing in which said holding means is secured, and means in said housing for establishing a magnetic field around said windings, said casing means being slidable in said holding means in the direction in which said material is adapted to pass therethrough whereby sliding movement of said casing and windings through said field produces signal voltage in said external-circuit connecting means.

12. In apparatus for magnetic testing of elongated material, a detecting coil assembly comprising two multi-turn coil-halves, each coil-half consisting of two side portions joined by curved ends, said coil-halves being disposed with their curved ends adjacent and their side portions bent to form substantially a circle and being interconnected so as to produce a substantially continuous circular electromagnetic field when a current is passed through them, a cylinder of insulating material divided longitudinally into separable symmetrical cylinder-halves, one each of said coil-halves being disposed on one of said cylinder-halves, respectively, a housing in which said divided cylinder is supported, and a plurality of similar bar magnets secured to said housing in magnetic symmetry external to and coaxial with said cylinder and on a circle concentric thereto.

13. Apparatus according to claim 12 in which said housing is divided along the same plane as said cylinder so that separation of the halves of said housing to open position permits the placing of elongated material within said coil assembly, and in which means are provided for retaining the halves of said housing together in closed position.

14. In apparatus for magnetic testing of elongated material in longitudinal movement, a detecting coil assembly through which the material is adapted to move, comprising two similar multi-turn coil-halves, a separate casing enclosing each coil-half and having a central semi-aperture, said casings being physically proportioned so that when placed together the two semi-apertures combine to form a single aperture shaped to accommodate the perimeter of the material to be tested, first separable connector means on each of said casings connected to terminals of the coil-half therein, supporting means for said casings including two complementary socket members, second separable connector means on said socket members disposed and adapted to engage with said first connector means, the lines of separation of said coil-halves and said socket members being in the same plane, said first and second connector means being engageable and disengageable along lines parallel to the longitudinal movement of said material, external-circuit connecting means, and electrical connections between certain of said second connector means and from others of said second connector means to said external-circuit connecting means such that the engagement of said first and second connector means connects said coil-halves together and simultaneously connects both of said coil-halves to said external-circuit connecting means.

15. In apparatus for magnetic testing of elongated material in longitudinal movement, a detecting coil assembly of plug-in type through which the material is adapted to move comprising a supporting cylinder of non-magnetic material divided longitudinally into two halves, a ring-like supporting member, means securing said supporting member to the inside of said cylinder, said supporting member being divided into two corresponding halves, said coil assembly comprising two similar multi-turn coil-halves, a separate non-magnetic casing enclosing each coil-half and having a central semi-aperture, said casings being proportioned so that when placed together the two semi-apertures combine to form a single aperture shaped to accommodate the perimeter of the material to be tested, first separable connector means on each of said casings connected to terminals of the coil-half therein, second separable connector means on each part of said supporting member disposed and adapted to engage with complementary first connector means, external-circuit connecting means connected to certain of said second connector means, and electrical connections between others of said second connector means such that the engagement of said first and second connector means connects said coil-halves together and simultaneously connects said coil assembly to said external-circuit connecting means.

16. Appartus according to claim 15 which includes a plurality of similar bar magnets symmetrically disposed in parallel relation to each other and to the axis of said coil assembly and means supporting said magnets in a circle concentric to said axis.

17. In apparatus for magnetic testing of material while in movement therethrough, a detecting coil assembly comprising a plurality of symmetrically formed windings disposed to closely surround the material to be tested, normally stationary casing means for said windings having an aperture through which the material may pass in electromagnetic relation to said windings, external-circuit connecting means, electric conductor means for connecting said windings to said connecting means, holding means disposed and proportioned to support said casing means by frictional engagement, a housing in which said holding means is secured, and means attached to said housing for establishing a magnetic field around said windings, said casing means being slidable in said holding means in a direction in which said material is adapted to move therethrough, whereby movement of said casing and windings relative to said field produces signal voltage in said external-circuit connecting means.

18. In apparatus for magnetic testing of wire rope and the like in longitudinal motion, a detecting coil assembly through which the rope is adapted to move from an entrance to an exit side thereof, an amplifier including signal-frequency selective means passing substantially only frequencies less than approximately 25 cycles per second, means connecting said coil assembly to the input of said amplifier, means for energizing the coils of said assembly with a regulated A.C. voltage, a signal responsive system including signal-amplitude-controlled switching means having a control element, said switching means being of the relaxation oscillator type which continues to oscillate in response to prolonged flaw signals, load-operate relay means including a momentary-operate relay which is actuated by a pulse from said switching means in response to each flaw detected by said coil, coupling means connecting the output of said amplifier to the control element of said switching means, said coupling means including signal polarity reversing means such that the signal pulses impressed on said control element are substantially only uni-idirectional, rope marking means disposed adjacent the travel path of said rope at the exit side of said coil assembly, and connections from said momentary-operate relay to said marking means for actuating the same momentarily in response to each operation of said momentary-operate relay, whereby the rope is visibly marked over a small area in close vicinity to each flaw therein and is marked substantially continuously in response to a prolonged signal.

19. In apparatus for magnetic testing of wire rope and the like in longitudinal motion, a detecting coil assembly through which the rope is adapted to move from an entrance to an exit side thereof, an amplifier including signal-frequency selective means passing substantially only frequencies less than approximately 25 cycles per second, means connecting said coil assembly to the input of said amplifier, means for energizing the coils of said assembly with a regulated A.C. voltage, a signal responsive system including signal-amplitude-controlled switching means having a control element, load-operate relay means including a momentary-operate relay actuated by said switching means and a holding relay actuated in response to operation of said momentary-operate relay, coupling means connecting the output of said amplifier to the control element of said switching means, said coupling means including signal polarity reversing means such that the signal pulses impressed on said control element are substantially only uni-directional, rope marking means disposed adjacent the travel path of said rope at the exit side of said coil assembly, connections from said momentary-operate relay to said marking means for actuating the same in response to momentary operation of said momentary-operate relay, and responsive means adapted to operate continuously and which is connected for actuation by said holding relay.

References Cited in the file of this patent

UNITED STATES PATENTS

| | | |
|---|---|---|
| 1,459,970 | Burrows | June 26, 1923 |
| 1,967,812 | Drake | July 24, 1934 |
| 2,102,452 | Zuschlag | Dec. 14, 1937 |
| 2,340,609 | Mestas | Feb. 1, 1944 |
| 2,351,944 | Engler | June 20, 1944 |
| 2,552,089 | Dionne | May 8, 1951 |
| 2,558,485 | Gow | June 26, 1951 |
| 2,650,344 | Lloyd | Aug. 25, 1953 |
| 2,656,503 | McKee et al. | Oct. 20, 1953 |
| 2,685,672 | Price et al. | Aug. 3, 1954 |
| 2,746,012 | Price | May 15, 1956 |
| 2,778,991 | Winkleman | Jan. 21, 1957 |

FOREIGN PATENTS

| | | |
|---|---|---|
| 758,730 | Germany | Sept. 28, 1953 |